(12) United States Patent
Joshi et al.

(10) Patent No.: US 11,947,789 B2
(45) Date of Patent: Apr. 2, 2024

(54) INTERACTIVE CONTROL METHOD AND APPARATUS, STORAGE MEDIUM, AND ELECTRONIC DEVICE

(71) Applicant: TENCENT TECHNOLOGY (SHENZEN) COMPANY LIMITED, Guangdong (CN)

(72) Inventors: Dhaval-jitendra Joshi, Shenzhen (CN); Xiaomei Chen, Shenzhen (CN); Wenjie Wu, Shenzhen (CN); Jingzhou Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 805 days.

(21) Appl. No.: 17/075,441

(22) Filed: Oct. 20, 2020

(65) Prior Publication Data

US 2021/0034212 A1 Feb. 4, 2021

Related U.S. Application Data

(63) Continuation of application No. PCT/CN2019/114396, filed on Oct. 30, 2019.

(30) Foreign Application Priority Data

Dec. 4, 2018 (CN) .......................... 201811475755.1

(51) Int. Cl.
*G06F 3/048* (2013.01)
*G02B 30/56* (2020.01)
(Continued)

(52) U.S. Cl.
CPC .......... *G06F 3/0488* (2013.01); *G02B 30/56* (2020.01); *G06F 3/04815* (2013.01); *G03H 2001/0061* (2013.01)

(58) Field of Classification Search
CPC .......... G06F 3/0488; G06F 3/00; G06F 3/048; G06F 3/04815; G06F 3/011;
(Continued)

(56) References Cited

U.S. PATENT DOCUMENTS

2012/0090005 A1* 4/2012 Marlow .................. H04N 5/74
348/E13.001
2013/0139062 A1 5/2013 Rhee
(Continued)

FOREIGN PATENT DOCUMENTS

CN 103902124 A 7/2014
CN 106612423 A 5/2017
(Continued)

OTHER PUBLICATIONS

Office Action dated Jul. 7, 2021 issued in corresponding Chinese patent application No. 201811475755.1 (with English transiation).
(Continued)

*Primary Examiner* — Pegeman Karimi
(74) *Attorney, Agent, or Firm* — ARENTFOX SCHIFF LLP

(57) ABSTRACT

This application includes an interactive control method and apparatus, a storage medium, and an electronic device. In these method, apparatus, storage medium, and device, a touch operation performed on a touch panel is recognized. A holographic projection device is configured to display a holographic projection-based virtual character. The touch panel is disposed on the holographic projection device. An interaction request is generated according to the recognized touch operation. The interaction request corresponds to an interaction with the holographic projection-based virtual character. Further the holographic projection-based virtual character is controlled to perform an interactive action associated with the interaction request.

20 Claims, 6 Drawing Sheets

(51) Int. Cl.
  *G06F 3/04815* (2022.01)
  *G06F 3/0488* (2022.01)
  *G03H 1/00* (2006.01)

(58) Field of Classification Search
  CPC . G06F 3/04845; G06F 3/04883; G02B 30/50; G02B 30/56; G03H 2001/0061
  See application file for complete search history.

(56) References Cited

U.S. PATENT DOCUMENTS

| | | | |
|---|---|---|---|
| 2016/0085332 A1* | 3/2016 | Herrera-Morales | G06F 3/0488 345/175 |
| 2016/0140763 A1* | 5/2016 | Seichter | G06F 3/038 345/633 |
| 2019/0235262 A1* | 8/2019 | Cheng | G02B 13/18 |

FOREIGN PATENT DOCUMENTS

| | | |
|---|---|---|
| CN | 106935163 A | 7/2017 |
| CN | 107340859 A | 11/2017 |
| CN | 107831905 A | 3/2018 |
| CN | 107908385 A | 4/2018 |
| CN | 110147196 A | 8/2019 |
| EP | 3116616 A1 | 1/2017 |
| WO | 2016075437 A1 | 5/2016 |
| WO | WO2017/114255 A1 | 7/2017 |

OTHER PUBLICATIONS

Extended European Search Report dated Mar. 28, 2022 in Application No. 19891843.5.
International Search Report Issued in Application PCT/CN2019/114396 dated Feb. 12, 2020, (5 pages).
Written Opinion Issued in Application PCT/CN2019/114396 dated Feb. 12, 2020 (4 pages).

* cited by examiner

INTERACTIVE CONTROL METHOD AND APPARATUS, STORAGE MEDIUM, AND ELECTRONIC DEVICE

RELATED APPLICATIONS

This application is a continuation of International Application No. PCT/CN2019/114396, filed on Oct. 30, 2019, which claims priority to Chinese Patent Application No. 201811475755.1, filed on Dec. 4, 2018 and entitled "INTERACTIVE CONTROL METHOD AND APPARATUS, STORAGE MEDIUM, AND ELECTRONIC DEVICE." The entire disclosures of the prior applications are hereby incorporated by reference in their entirety.

FIELD OF THE TECHNOLOGY

This application relates to the field of computers, including interactive control.

BACKGROUND OF THE DISCLOSURE

With the continuous development of virtual imaging technology, some application developers have begun to produce a holographic projection device by using three-dimensional holographic projection technology powered by artificial intelligence (AI). The holographic projection device may display a holographic projection-based virtual role that performs real-time information interaction with a user. After repeated interaction with the user, the holographic projection-based virtual role can learn the user's hobbies and habits and accurately respond in time to an instruction issued by the user and can also gradually develop a unique role personality.

However, how to effectively implement interactive control between the user and the holographic projection-based virtual role in the holographic projection device is still a technical problem that urgently needs to be resolved.

SUMMARY

Embodiments of this application include an interactive control method and apparatus, a storage medium, and an electronic device, to implement interactive control between a user and a holographic projection-based virtual role in a holographic projection device, that resolves the aforementioned technical problem and other technical problems.

According to an aspect of the embodiments of this application, an interactive control method is provided. In the method, a touch operation performed on a touch panel is recognized. A holographic projection device is configured to display a holographic projection-based virtual character. The touch panel is disposed on the holographic projection device. An interaction request is generated according to the recognized touch operation. The interaction request corresponds to an interaction with the holographic projection-based virtual character. The holographic projection-based virtual character is controlled to perform an interactive action associated with the interaction request.

According to another aspect of the embodiments of this application, a holographic projection device is provided. The holographic projection device includes a holographic projection film, circuitry, and a touch panel. The holographic projection film is configured to display a holographic projection-based virtual character. The circuitry is configured to control the holographic projection-based virtual character to be projected onto the holographic projection film. The touch panel is configured to acquire touch information generated based on a touch operation. The circuitry is configured to recognize the touch operation according to the touch information. The circuitry is configured to generate an interaction request according to the recognized touch operation, the interaction request being used for requesting interaction with the holographic projection-based virtual character. The circuitry is further configured to control the holographic projection-based virtual character according to the interaction request to perform an interactive action matching the interaction request According to yet another aspect of the embodiments of this application, an interactive control apparatus is provided. The interactive control apparatus includes circuitry configured to recognize a touch operation performed on a touch panel of a holographic projection device. The holographic projection device is configured to display a holographic projection-based virtual character. The touch panel being disposed on the holographic projection device. The circuitry is configured to generate an interaction request according to the recognized touch operation, the interaction request corresponding to an interaction with the holographic projection-based virtual character. The circuitry is further configured to control the holographic projection-based virtual character to perform an interactive action associated with the interaction request According to yet another aspect of the embodiments of this application, a non-transitory computer-readable storage medium is provided, the storage medium storing instructions which when executed by a computer cause the computer to perform the foregoing interactive control method.

Accordingly to some aspects of the embodiments, a touch operation performed on a touch panel that is disposed on a holographic projection device is recognized, the holographic projection device being configured to display a holographic projection-based virtual role (or character); an interaction request is generated according to the recognized touch operation, the interaction request being used for requesting interaction with the holographic projection-based virtual role; and the holographic projection-based virtual role is controlled to perform an interactive action matching the interaction request. In a process of controlling the holographic projection device, the touch operation is received by using the touch panel, and an operation is performed on the holographic projection device according to the touch operation, so that interaction with the holographic projection-based virtual role in the holographic projection device can be performed fast and accurately according to the touch operation received by the touch panel, and the technical effect of flexible, accurate, and efficient control of a virtual partner is implemented, thereby resolving the technical problem that the virtual partner in the related art has monotonous control modes.

BRIEF DESCRIPTION OF THE DRAWINGS

The accompanying drawings described herein are used for providing a further understanding of this application, and form a part of this application. Exemplary embodiments of this application and descriptions thereof are used for explaining this application, and are not intended to limit the scope of this application. In the accompanying drawings.

DESCRIPTION OF EMBODIMENTS

Figure 1:
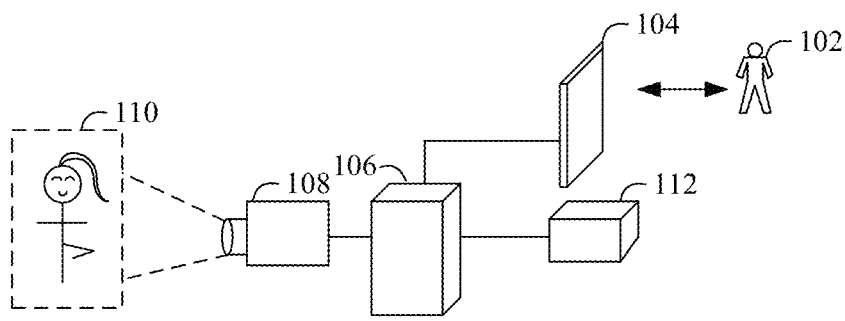
FIG. 1 is a schematic diagram of an application environment of an exemplary interactive control method according to an embodiment of this application.

To allow a person skilled in the art to better understand solutions of this application, the following describes technical solutions in the embodiments of this application with reference to the accompanying drawings in the embodiments of this application. The described embodiments are merely some rather than all of the embodiments of this application. Other embodiments that can be obtained by a person of ordinary skill in the art based on the embodiments of this application shall fall within the protection scope of this application.

In the specification, claims, and accompanying drawings of this application, the terms "first," "second," and so on are intended to distinguish between similar objects rather than describe a specific order or sequence. It is to be understood that the data termed in this way are interchangeable in a proper case, so that the embodiments of this application described herein can be implemented in other orders than the orders illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

According to an aspect of the embodiments of this application, an interactive control method is provided. Optionally, in an implementation, the foregoing interactive control method may be applied to, but is not limited to, an environment shown in FIG. 1. A user 102 may perform a touch operation on a touch panel 104, and a host 106 recognizes the touch operation after obtaining the touch operation received by the touch panel 104, and generates an interaction request according to a recognition result. The host 106 controls, according to the interaction request, a holographic projection-based virtual role (or character) 110 projected by a projector 108 to perform an interactive action matching the interaction request. In this device, a battery 112 is configured to power the whole device.

FIG. 1 is merely an example of a hardware structure, and does not constitute a limitation on this embodiment. The touch panel 104 and the projector 108 may exist separately. In this case, the touch panel 104 transmits a touch signal to the host 106 by using a signal transmission device connected to the touch panel 104. The projector 108 receives a to-be-projected interactive action from the host 106 by using a signal receiving apparatus.

In the related art, in a case that a holographic projection-based virtual role is displayed by using a holographic projection device, a client or a speech instruction are usually used for interacting with the holographic projection device. However, the foregoing method for interacting with the holographic projection device has monotonous control instructions, and the holographic projection device can only make simple responses. However, in this embodiment, a touch operation is obtained by using a touch panel, the touch operation is recognized, an interaction request is generated according to the recognized touch operation, and an interactive action matching the interaction request is performed according to the interaction request. In the foregoing method, a holographic projection device can be directly controlled by using a touch operation received by a touch panel, thereby providing varied instructions for controlling the holographic projection device, and improving the flexibility of the interaction with a holographic projection-based virtual role.

Figure 2:
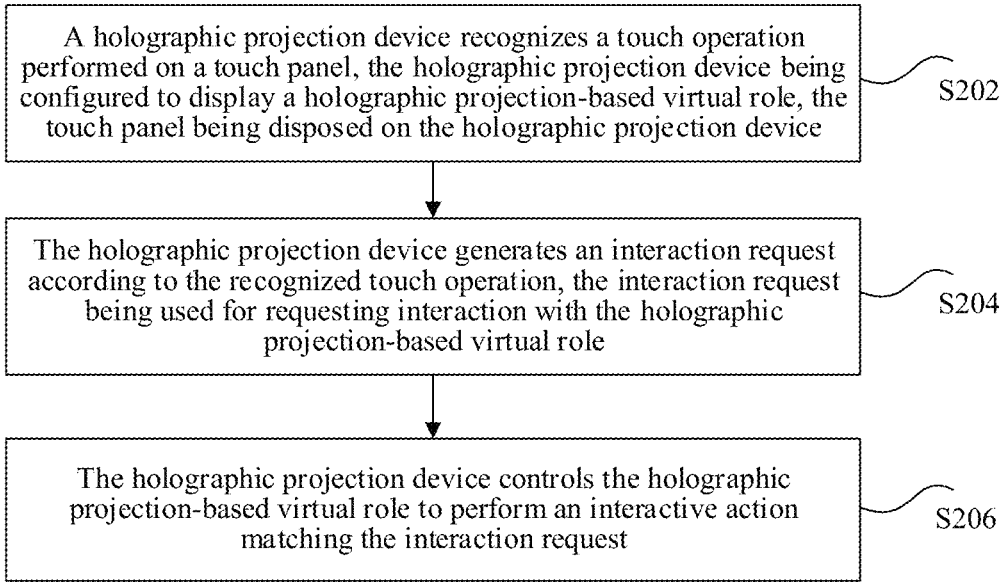
FIG. 2 is a schematic flowchart of an exemplary interactive control method according to an embodiment of this application.

For convenience of understanding and explaining the interactive control method provided in this embodiment of this application, the description is made with reference to FIG. 2 below. The interactive control method provided in this embodiment of this application may be applied to a holographic projection device, and in an optional implementation, the interactive control method may include the following steps.

In step S202, a holographic projection device recognizes a touch operation performed on a touch panel. The holographic projection device is configured to display a holographic projection-based virtual role. Further, the touch panel is disposed on the holographic projection device.

In step S204, the holographic projection device generates an interaction request according to the recognized touch operation. The interaction request is used for requesting interaction with the holographic projection-based virtual role.

In step S206, the holographic projection device controls the holographic projection-based virtual role to perform an interactive action matching the interaction request.

For example, the foregoing interactive control method may be applied to, but is not limited to, a process of interacting with the holographic projection-based virtual role in the holographic projection device. For example, the foregoing interactive control method may be applied to a process of interacting with a projected holographic virtual cartoon character, and may also be applied to a process of interacting with a projected holographic virtual building.

For convenience of understanding and description, an example in which the interactive control method is applied to the process of interacting with a holographic virtual cartoon character projected by the holographic projection device is used for description. In a case that the holographic virtual cartoon character is projected by the holographic projection device, a user may observe the holographic virtual cartoon character. In this case, after the user touches the touch panel to generate a touch operation, the holographic projection device recognizes the touch operation, generates an interaction request, and controls the holographic virtual cartoon character according to the interaction request to perform an interactive action, such as to become shy, matching the interaction request. In this case, the user may see that the holographic virtual cartoon character performs the interactive action, thereby completing the interaction between the user and the holographic virtual cartoon character.

In this embodiment, a holographic projection device uses a control method in which a touch operation is first obtained by using a touch panel, so that the touch operation is recognized, and an interaction request is then generated according to the recognized touch operation, so that an interactive action matching the interaction request is performed according to the interaction request. In the control method, the holographic projection device can be directly controlled by using a touch operation received by a touch panel, thereby providing varied instructions for controlling the holographic projection device, and improving the flexibility of the interaction with a holographic projection-based virtual role.

For example, the interactive action may include, but is not limited to, a body movement of the holographic projection-based virtual role and/or a voice of the holographic projection-based virtual role. For example, the "controlling the holographic projection-based virtual role to perform an interactive action matching the interaction request" may be: controlling the holographic projection-based virtual role to play an animation matching the interaction request; and/or, controlling the holographic projection-based virtual role to play audio matching the interaction request.

The controlling the holographic projection-based virtual role to play audio may include, but is not limited to, controlling the mouth of the holographic projection-based virtual role to change and simultaneously playing the audio by using a sound playing apparatus.

The touch operation may be obtained by using touch information generated by the interaction between a touch point and the touch panel. After the touch information is obtained, the touch operation is recognized according to the touch information.

The touch information may include, but is not limited to, at least one of the following: touch action duration of the touch point, a touch trajectory of the touch point, and a touch position of the touch point.

The touch point may include, but is not limited to, a touch position between a human body or a tool used by a human body and the touch panel. The human body may include, but is not limited to, any part such as a finger, a palm, the back of a hand, a nail, the forehead, the chin or a cheek of a human. The touch point may include, but is not limited to, a plurality of touch points. For example, in a case that the palm touches the touch panel, a plurality of touch points is formed. The plurality of touch points is synchronized and acts accordingly. In a case that the finger touches a touch screen, a touch point is formed. The touch information may include, but is not limited to, movement information of the touch point or time information of the touch point. For example, an example in which the touch point is a touch position between the finger and the touch screen is used for description. The finger may move in a process of touching the touch panel to leave a trajectory on the touch screen; or the finger touches the touch screen a single time and leaves in a short time, so that a click operation is performed on the touch screen. In this way, the trajectory or the click operation may be used as the touch information, to recognize the touch operation according to the touch information.

Optionally, the recognizing, by the holographic projection device, the touch operation according to the touch information includes:

(1) determining, by the holographic projection device, that the touch operation is a caress performed on the holographic projection-based virtual role in a case that the touch information indicates that a quantity of swipes performed on the touch panel by the touch point is greater than a first threshold, an action in which a movement distance of the touch point on the touch panel is greater than a second threshold being recognized as the swipe; and (2) in a case that the touch information indicates that the movement distance of the touch point on the touch panel is less than a third threshold and action duration of the touch point on the touch panel is less than a fourth threshold, the holographic projection device determines that the touch operation is a pat performed on the holographic projection-based virtual role.

Figure 3:
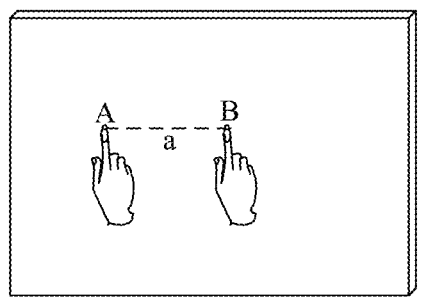
FIG. 3 is a schematic diagram of an exemplary interactive control method according to an embodiment of this application.

The first threshold, second threshold, third threshold, and fourth threshold may be set according to empirical values, but are not limited thereto. For example, the touch point is formed through the touch between the finger and the touch panel. As shown in FIG. 3, after the finger touches the touch panel and forms a touch point A, the finger moves from the touch point A to a touch point B, a movement distance being a. A relationship between a and the first threshold is determined, and in a case that a is greater than or equal to the second threshold, it indicates that a current operation is a swipe. In a case that a is less than the third threshold, it indicates that the current operation is not a swipe, and other conditions are required for determination. Optionally, the action duration may include, but is not limited to, duration of existence of the touch point a single time. For example, the finger touches the touch panel for one second, so the action duration is one second.

Further, in a case that it is determined that the current operation is a swipe, in a case that a plurality of swipes is received, a quantity of received swipes is determined. In a case that the quantity of swipes is greater than the first threshold, the holographic projection device may calculate to determine that the user performs the plurality of swipes on the touch panel. In this case, the holographic projection device may determine that the user is performing a caress. In a case that the current operation is not a swipe, and the action duration of the current operation is less than the fourth threshold, the holographic projection device may calculate to determine that the user performs a single short-time touch operation on the touch panel. In this case, the holographic projection device may determine that the user is performing a pat.

The determining, by holographic projection device, that the touch operation is the caress performed on the holographic projection-based virtual role may include, but is not limited to, the following methods: obtaining, by the holographic projection device, a first position at which the touch point stays on the touch panel at a first moment and a second position at which the touch point stays on the touch panel at a second moment, a time interval between the first moment and the second moment being a frame period; recognizing, by the holographic projection device in a case that a distance between the first position and the second position is greater than the second threshold, an action in which the touch point moves from the first position to the second position as the swipe, and adding one to the quantity of swipes; and determining, by the holographic projection device in a case that the quantity of swipes is greater than the first threshold, that the touch operation is the caress performed on the holographic projection-based virtual role.

Figure 4:
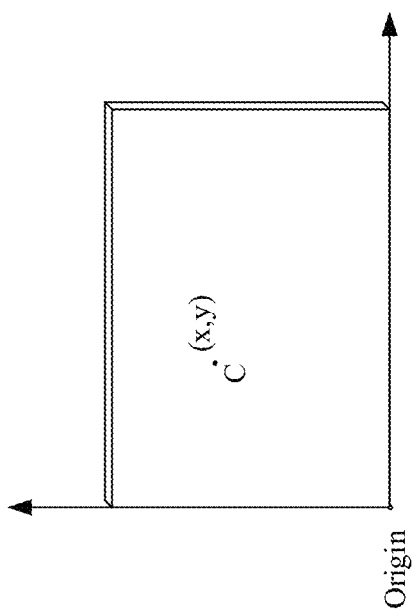
FIG. 4 is a schematic diagram of another exemplary interactive control method according to an embodiment of this application.

The method may include, but is not limited to, adding coordinate information to the touch screen. For example, FIG. 4 shows an optional touch node of the touch screen. A plane rectangular coordinate system is set with the lower left corner of the touch screen as the origin and the touch screen as the plane. Any point on the touch screen can obtain a coordinate value. For example, the coordinates of a point C are (x, y), x and y being positive numbers.

Figure 5:
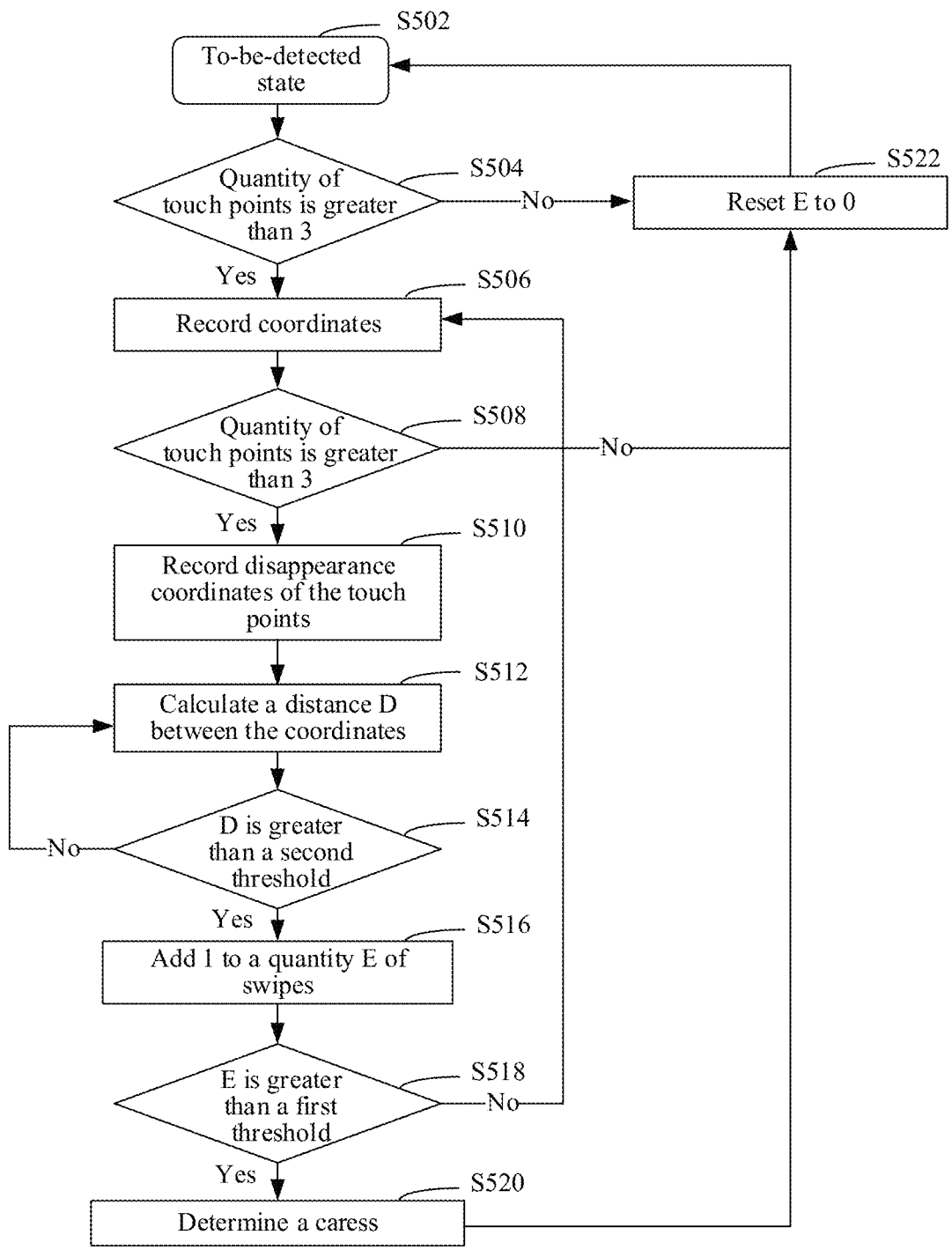
FIG. 5 is a schematic flowchart of another exemplary interactive control method according to an embodiment of this application.

An exemplary description of a case that the palm touches the touch screen is provided with reference to FIG. 5. In a case that it is determined that the touch panel is in a to-be-detected state (S502), the palm touches the touch panel. It is determined by S504 whether a quantity of touch points is greater than 3, and in a case that the quantity of touch points is greater than 3, the coordinates of the touch points are recorded by S506. In this case, the coordinates of one of the touch points may be chosen, or the coordinates of all the touch points may be recorded. In a case that the touch points disappear, it is determined by S508 whether a quantity of the touch points is greater than 3 before the touch points disappear, and in a case that the quantity of the touch points is greater than 3, the disappearance coordinates of the touch points are recorded by S510. In this case, a touch point whose start coordinates are recorded may be chosen and the disappearance coordinates of the touch point are recorded, or the disappearance coordinates of all the touch points may be recorded. The start coordinates and disappearance coordinates of each touch point correspond to each other. A distance D between the start coordinates and the disappearance coordinates of a touch point is calculated by S512, and it is determined by S514 whether D is greater than the second threshold. In a case that D is greater than the second threshold, 1 is added to a quantity E of swipes by S516. It is determined by S518 whether E is greater than the first threshold, and in a case that E is greater than the first threshold, it is determined that a currently performed action is a caress. In this process, in a case that the quantity of the touch points in S504 and S508 is not greater than 3 or after it is determined that the current action is a caress, S522 is performed, and E is reset to 0. In a case of determining whether the quantity of the touch points is greater than 3, 3 may be set flexibly. In addition, the foregoing process is a process of determining whether the palm is performing a caress. In a case of determining whether the finger (or other parts) is performing a caress, the method may include, but is not limited to, deleting steps of S504 and S508 in the process in FIG. 5, and it is not necessary to determine whether the quantity of the touch points is greater than 3. It may be determined whether a current operation is the caress by using the remaining steps in FIG. 5.

The determining, by holographic projection device, that the touch operation is the pat performed on the holographic projection-based virtual role may include, but is not limited to, the following methods: obtaining, by the holographic projection device, a third position at which the touch point stays on the touch panel at a third moment and a fourth position at which the touch point stays on the touch panel at a fourth moment; and determining, by the holographic projection device in a case that a distance between the third position and the fourth position is less than the third threshold and a time interval between the third moment and the fourth moment is less than the fourth threshold, that the touch operation is the pat performed on the holographic projection-based virtual role.

Figure 6:
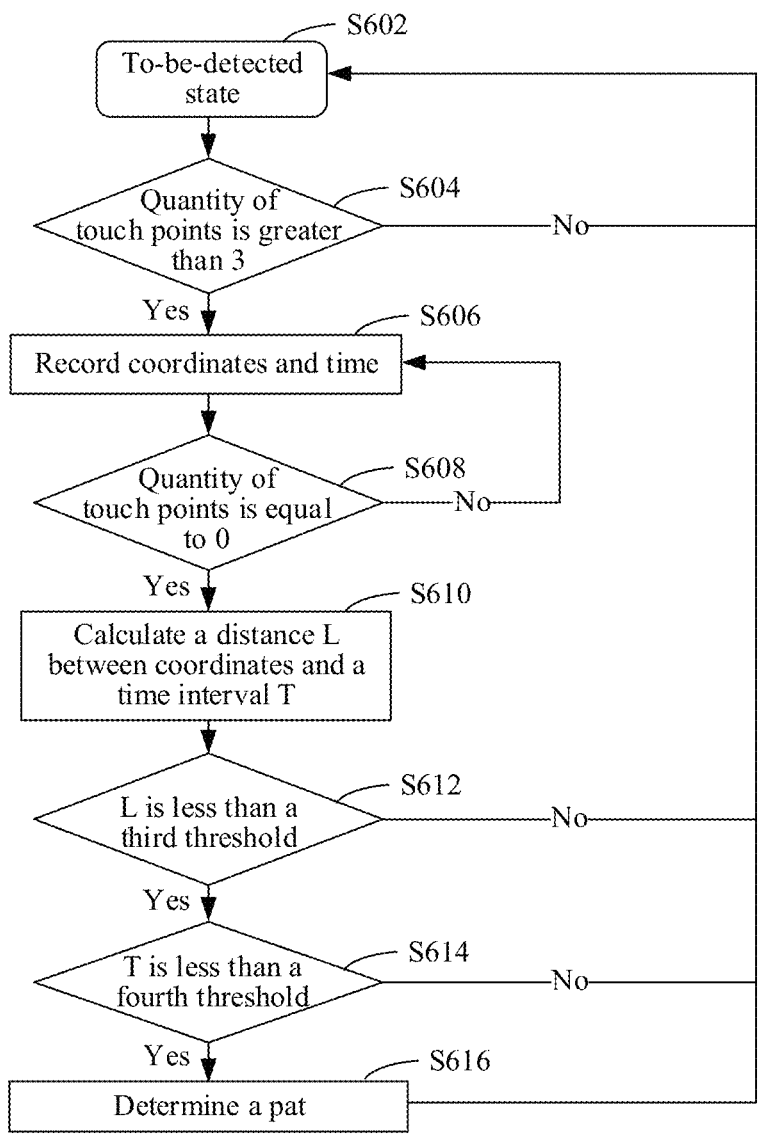
FIG. 6 is a schematic flowchart of yet another optional interactive control method according to an embodiment of this application.

For example, the description is provided below with reference to FIG. 6. For example, the touch operation is an operation performed on the touch panel by the palm. In a case that it is determined that the touch panel is in a to-be-detected state (S602), after the palm touches the touch panel, it is determined by S604 whether the quantity of the touch points is greater than 3, and in a case that the quantity of the touch points is greater than 3, the coordinates and generation moment of one touch point or all the touch points are recorded by S606. It is determined by S608 whether the quantity of the touch points is equal to 0, and in a case that the quantity of the touch points is equal to 0, the disappearance coordinates and disappearance moment of the one touch point or all the touch points are recorded, and a distance L between the coordinates of the touch point (e.g., a distance between the start coordinates and the disappearance coordinates of the touch point), and a time interval T between a generation moment and a disappearance moment of the touch point is calculated by S610. It is determined by S612 whether L is less than the third threshold, and it is determined by S614 whether T is less than the fourth threshold. In a case that L is less than the third threshold and T is less than the fourth threshold, it is determined by S616 that the current operation is a pat. In a case that L is greater than or equal to the third threshold, or T is greater than or equal to the fourth threshold, or it is determined that the current operation is a pat, the touch panel enters the to-be-detected state in S602 again. In addition, in a case that the touch point does not disappear, the position of the touch point and a current moment are periodically recorded.

After the recognizing, by the holographic projection device, the touch operation according to the touch information, the method further includes: obtaining, by the holographic projection device, an action region of the interaction between the touch point and the touch panel; and determining, by the holographic projection device according to a position of the action region on the touch panel, interactive information requested by the interaction request.

Figure 7:
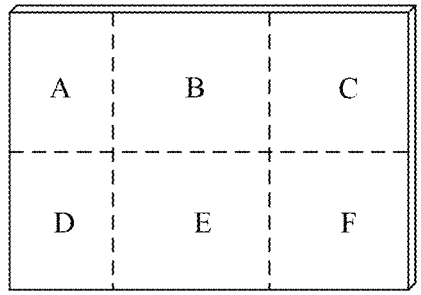
FIG. 7 is a schematic diagram of yet another exemplary interactive control method according to an embodiment of this application.

For example, as shown in FIG. 7, the touch panel is divided into six regions, A, B, C, D, E, and F, and the interaction generated in different regions correspond to different interactive information.

After the touch panel is divided into different regions, the sizes and shapes of the regions may be the same or different, and a quantity of the divided regions may be any positive number greater than or equal to 1.

For example, the determining, by the holographic projection device according to a position of the action region on the touch panel, interactive information requested by the interaction request includes either or both of the following two steps:

(1) The holographic projection device determines, according to the position of the action region on the touch panel, a role part of the interaction with the holographic projection-based virtual role; and determines, according to the role part, the interactive information requested by the interaction request.

Figure 8:
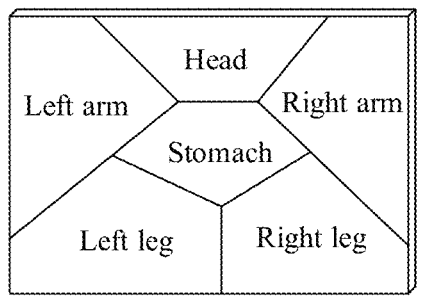
FIG. 8 is a schematic diagram of yet another exemplary interactive control method according to an embodiment of this application.

The method may include, but is not limited to, dividing the touch panel into different regions, and different regions represent different role parts. For example, as shown in FIG. 8, the touch panel is divided into six parts, and the parts respectively correspond to the head, the left arm, the right arm, the stomach, the left leg, and the right leg. Touching different regions indicates interacting with different body parts of the role, for example, patting the head or caressing the stomach.

(2) The holographic projection device determines, according to the position of the action region on the touch panel, an interaction type of the interaction with the holographic projection-based virtual role; and determines, according to the interaction type, the interactive information requested by the interaction request.

The interaction type may include, but is not limited to, an interaction form or an interaction mode. The interaction form may include, but is not limited to, an action performed by the role or a played sound, and the interaction mode may include, but is not limited to, a current mode of the role.

The mode may include, but is not limited to, a plurality of modes of imitating human emotions, for example, a shy mode, an upset mode, a scared mode, and a cute mode.

Figure 9:
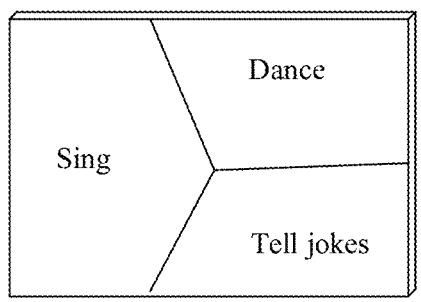
FIG. 9 is a schematic diagram of yet another exemplary interactive control method according to an embodiment of this application.
Figure 10:
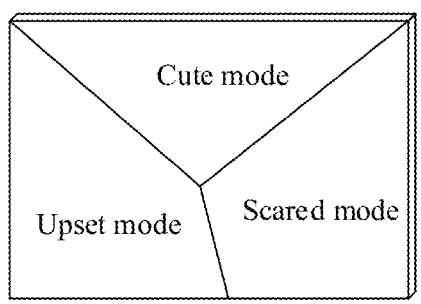
FIG. 10 is a schematic diagram of yet another exemplary interactive control method according to an embodiment of this application.

For example, in FIG. 9, different positions of the touch panel are set to perform different interaction forms (for example, dancing or singing). Moreover, in FIG. 10, different positions of the touch panel are set as different modes of imitating human emotions, such as a shy mode and a cute mode).

For example, the interactive control method further includes: adjusting, by the holographic projection device, a mood parameter of the holographic projection-based virtual role; and controlling, by the holographic projection device, a role response mode of the holographic projection-based virtual role in a case that it is determined that the mood parameter reaches a target value, and/or, enabling, by the holographic projection device, a hidden skill of the holographic projection-based virtual role in a virtual scene.

In this embodiment of this application, an execution time of the adjusting, by the holographic projection device, a mood parameter of the holographic projection-based virtual role is not limited, which, for example, may be performed when controlling the holographic projection-based virtual role to perform an interactive action matching the interaction request.

The mood parameter may be indicated by using a number or in a form such as a quantity of red hearts or an energy value. The hidden skill may include, but is not limited to, a new animation, a new sound or a new phase. For example, the hidden skill is a new animation. After the mood parameter reaches a particular value, the role may be allowed to play the new animation. In a case that the mood parameter does not reach a particular value, the role is not allowed to play the new animation.

According to this embodiment, a holographic projection device performs a method in which a touch operation is obtained by using a touch panel, so that the touch operation is recognized, an interaction request is generated according to the recognized touch operation, and an interactive action matching the interaction request is performed according to the interaction request. In the foregoing method, the holographic projection device can be directly controlled by using a touch operation received by a touch panel, thereby providing varied instructions for controlling the holographic projection device, and improving the flexibility of the interaction with a holographic projection-based virtual role.

Based on the scenario content described above, different implementations of the interactive control method provided in this embodiment of this application are described below in detail with reference to the scenario content.

In an exemplary implementation, the recognizing, by the holographic projection device, the touch operation performed on the touch panel disposed on the holographic projection device includes the following steps.

In a first step, the holographic projection device obtains the touch information generated by the interaction between the touch point corresponding to the touch operation and the touch panel.

In a second step, the holographic projection device recognizes the touch operation according to the touch information.

For example, the finger interacts with the touch panel. After the finger interacts with the touch panel, the position of the touch is the touch point. In a case that the finger moves, the touch point may move accordingly. A movement trajectory of the touch point, touch action duration of the finger, and the position of the touch point are obtained and used as the touch information. The touch operation is recognized according to the touch information.

According to this embodiment, the touch information generated by the interaction between the touch point corresponding to the touch operation and the touch panel is obtained, and the touch operation is recognized according to the touch information, thereby improving the flexibility of controlling the holographic projection device.

In an exemplary implementation, the recognizing, by the holographic projection device, the touch operation according to the touch information includes the following steps:

In a first step, the holographic projection device determines, in a case that it is determined according to the touch information that a quantity of swipes performed on the touch panel by the touch point is greater than a first threshold, that the touch operation is a caress performed on the holographic projection-based virtual role, the swipe being an action in which a movement distance of the touch point on the touch panel is greater than a second threshold.

In a second step, the holographic projection device determines, in a case that it is determined according to the touch information that the movement distance of the touch point on the touch panel is less than a third threshold and action duration of the touch point on the touch panel is less than a fourth threshold, that the touch operation is a pat performed on the holographic projection-based virtual role.

The first threshold, second threshold, third threshold, and fourth threshold may be set according to empirical values, but are not limited thereto. For example, the touch point is formed through the touch between the finger and the touch panel. As shown in FIG. 3, after the finger touches the touch panel and forms a touch point A, the finger moves from the touch point A to a touch point B, a movement distance being a. A relationship between a and the first threshold is determined, and in a case that a is greater than or equal to the second threshold, it indicates that the current operation is a swipe. In a case that a is less than the third threshold, it indicates that the current operation is not a swipe, and other conditions are required for determination. Optionally, the action duration may include, but is not limited to, duration of existence of the touch point a single time. For example, the finger touches the touch panel for one second, so the action duration is one second.

Further, in a case that it is determined that the current operation is a swipe, in a case that a plurality of swipes is received, a quantity of received swipes is determined. In a case that the quantity of swipes is greater than the first threshold, the holographic projection device may calculate to determine that the user performs the plurality of swipes on the touch panel. In this case, the holographic projection device may determine that the user is performing a caress. In a case that the current operation is not a swipe, and the action duration of the current operation is less than the fourth threshold, the holographic projection device may calculate to determine that the user performs a single short-time touch operation on the touch panel. In this case, the holographic projection device may determine that the user is performing a pat.

According to this embodiment, the touch information is compared with the first threshold, second threshold, third threshold, and fourth threshold, so that it is determined whether the current touch operation is a caress or a pat, thereby improving the accuracy of determining the current touch operation, and improving the flexibility of controlling the holographic projection device.

In an exemplary implementation, the determining, by the holographic projection device, that the touch operation is the caress performed on the holographic projection-based virtual role includes the following steps.

In a first step, the holographic projection device obtains a first position at which the touch point stays on the touch panel at a first moment and a second position at which the touch point stays on the touch panel at a second moment, a time interval between the first moment and the second moment being a frame period.

In a second step, the holographic projection device recognizes, in a case that it is determined that a distance between the first position and the second position is greater than the second threshold, an action in which the touch point moves from the first position to the second position as the swipe, and adds one to the quantity of swipes.

In a third step, the holographic projection device determines that the touch operation is a caress performed on the holographic projection-based virtual role in a case that it is determined that the quantity of swipes is greater than the first threshold.

The description of a case that the palm touches the touch screen is provided with reference to FIG. 5. A touch panel is in a to-be-detected state (S502). In this case, the palm touches the touch panel. It is determined by S504 whether a quantity of touch points is greater than 3, and in a case that the quantity of touch points is greater than 3, the coordinates of the touch points are recorded by S506. In this case, the coordinates of one of the touch points may be chosen, or the coordinates of all the touch points may be recorded. In a case that the touch points disappear, it is determined by S508 whether a quantity of the touch points is greater than 3 before the touch points disappear, and in a case that the quantity of the touch points is greater than 3, the disappearance coordinates of the touch points are recorded by S510. In this case, a touch point whose start coordinates are recorded may be chosen and the disappearance coordinates of the touch point are recorded, or the disappearance coordinates of all the touch points may be recorded. Start coordinates and disappearance coordinates of each touch point correspond to each other. A distance D between the start coordinates and the disappearance coordinates of a touch point is calculated by S512, and it is determined by S514 whether D is greater than the second threshold. In a case that D is greater than the second threshold, 1 is added to a quantity E of swipes by S516. It is determined by S518 whether E is greater than the first threshold, and in a case that E is greater than the first threshold, it is determined that a currently performed action is a caress. In this process, in a case that the quantity of the touch points in S504 and S508 is not greater than 3 or after it is determined that the current action is a caress, S522 is performed, and E is reset to 0. In a case of determining whether the quantity of the touch points is greater than 3, 3 may be set flexibly. In addition, the foregoing process is a process of determining whether the palm is performing a caress. In a case of determining whether the finger (or other parts) is performing a caress, the method may include, but is not limited to, deleting steps of S504 and S508 in the process in FIG. 5, and it is not necessary to determine whether the quantity of the touch points is greater than 3. It may be determined whether a current operation is the caress by using the remaining steps in FIG. 5.

According to this embodiment, it is determined whether the current operation is a caress by using the foregoing method, thereby improving the accuracy of determining the current touch operation, and improving the flexibility of controlling the holographic projection device.

In an exemplary implementation, the determining, by the holographic projection device, that the touch operation is the pat performed on the holographic projection-based virtual role includes the following steps.

In a first step, the holographic projection device obtains a third position at which the touch point stays on the touch panel at a third moment and a fourth position at which the touch point stays on the touch panel at a fourth moment.

In a second step, the holographic projection device determines, in a case that it is determined that a distance between the third position and the fourth position is less than the third threshold and a time interval between the third moment and the fourth moment is less than the fourth threshold, that the touch operation is the pat performed on the holographic projection-based virtual role.

For example, the description is provided below with reference to FIG. 6. For example, the touch operation is an operation performed on the touch panel by the palm. The touch panel is in a to-be-detected state (S602). After the palm touches the touch panel, it is determined by S604 whether a quantity of touch points is greater than 3, and in a case that the quantity of touch points is greater than 3, the coordinates and generation moment of one touch point or all the touch points are recorded by S606. It is determined by S608 whether the quantity of the touch points is equal to 0, and in a case that the quantity of the touch points is equal to 0, the disappearance coordinates and disappearance moment of the one touch point or all the touch points are recorded. A distance L between the coordinates of the touch point and a time interval T between a generation moment and a disappearance moment of the touch point are calculated by S610. It is determined by S612 whether L is less than the third threshold, and it is determined by S614 whether T is less than the fourth threshold. In a case that L is less than the third threshold and T is less than the fourth threshold, it is determined by S616 that the current operation is a pat. In a case that L is greater than or equal to the third threshold, or T is greater than or equal to the fourth threshold, or it is determined that the current operation is a pat, the touch panel enters the to-be-detected state in S602 again. In addition, in a case that the touch point does not disappear, the position of the touch point and a current moment are periodically recorded.

According to this embodiment, it is determined whether the current operation is a pat by using the foregoing method, thereby improving the accuracy of determining the current touch operation, and improving the flexibility of controlling the holographic projection device.

In an exemplary implementation, the obtaining, by the holographic projection device, a fourth position at which the touch point stays on the touch panel at a fourth moment includes the following steps:

In a first step, the holographic projection device performs the following steps in each frame period after the third position at which the touch point stays on the touch panel is obtained, until it is detected that the touch operation is ended:

In a second step, the holographic projection device obtains a current position at which the touch point stays on the touch panel at a target moment in a current frame period, a time interval between the third moment and the target moment being N frame periods, N≥1, N being an integer.

In a third step, the holographic projection device obtains, in a case that it is detected that the touch operation is not ended, a target position at which the touch point stays on the touch panel at the target moment in a next frame period of the current frame period, uses the target moment in the next frame period as the target moment in the current frame period, and uses the target position at which the touch point stays in the next frame period as the current position.

In a fourth step, the holographic projection device uses, in a case that it is detected that the touch operation is ended, the target moment in the current frame period as the fourth moment, and uses the current position as the fourth position.

In a fifth step, it is determined that the touch operation is ended in a case that an action region of the touch point on the touch panel is less than a fifth threshold.

For example, an example in which the finger touches the touch panel is still used for description. In a case that the finger touches the touch panel, a current position and a current time of the touch point are obtained. In a case that the touch operation is not ended, a touch position and a touch time of the touch point of the next frame period are obtained until the touch operation is ended, and a touch position and a touch time at a moment before the end are obtained. The touch position at the moment before the touch operation is ended is determined as the fourth position, and the touch time at the moment before the touch operation is ended is determined as a fourth moment. Because an area of the touch point between the finger and the touch panel increases as finger pressure increases, in a case that the area of the touch point is reduced to an empirical value, it indicates that the touch operation is ended and the finger leaves the touch panel.

According to this embodiment, the fourth moment and the fourth position are determined by using the foregoing method, thereby improving the accuracy of determining the fourth moment and the fourth position. The flexibility of controlling the holographic projection device is further improved.

In an exemplary implementation, after the recognizing the touch operation according to the touch information, the method further includes the following steps.

In a first step, the holographic projection device obtains an action region of the interaction between the touch point and the touch panel.

In a second step, the holographic projection device determines, according to a position of the action region on the touch panel, interactive information requested by the interaction request.

For example, as shown in FIG. 7, the touch panel is divided into six regions, A, B, C, D, E, and F, and the interaction generated in different regions correspond to different interactive information.

In some embodiments, after the touch panel is divided into different regions, the sizes and shapes of the regions may be the same or different, and a quantity of the divided regions may be any positive number greater than or equal to 1.

According to this embodiment, the interactive information is determined according to the position of the action region of the interaction between the touch point and the touch panel on the touch panel, thereby improving the flexibility of controlling the holographic projection device.

In an exemplary implementation, the determining, by the holographic projection device according to a position of the action region on the touch panel, interactive information requested by the interaction request includes either or both of the following two steps:

(1) The holographic projection device determines, according to the position of the action region on the touch panel, a role part of the interaction with the holographic projection-based virtual role; and determines, according to the role part, the interactive information requested by the interaction request.

(2) The holographic projection device determines, according to the position of the action region on the touch panel, an interaction type of the interaction with the holographic projection-based virtual role; and determines, according to the interaction type, the interactive information requested by the interaction request.

The interaction type may include, but is not limited to, an interaction form or an interaction mode. The interaction form may include, but is not limited to, an action performed by the role or a played sound, and the interaction mode may include, but is not limited to, a current mode of the role.

The mode may include, but is not limited to, a plurality of modes of imitating human emotions, for example, a shy mode, an upset mode, a scared mode, and a cute mode.

For example, as shown in FIG. 8, the touch panel is divided into six parts, and the parts respectively correspond to the head, the left arm, the right arm, the stomach, the left leg, and the right leg. Touching different regions indicates interacting with different body parts of the role, for example, patting the head or caressing the stomach. Alternatively, reference is made to FIG. 9 and FIG. 10. In FIG. 9, different positions of the touch panel are set to perform different interaction forms, such as dancing or singing). Moreover, in FIG. 10, different positions of the touch panel are set as different modes of imitating human emotions, such as a shy mode and a cute mode).

According to this embodiment, according to different positions of the action region on the touch panel, a role part or an interaction type of the interaction with the holographic projection-based virtual role is determined, thereby improving the flexibility of controlling the holographic projection device.

In an exemplary implementation, the controlling, by the holographic projection device, the holographic projection-based virtual role to perform an interactive action matching the interaction request includes at least one of the following steps:

(1) The holographic projection device controls the holographic projection-based virtual role to play an animation matching the interaction request.

(2) The holographic projection device controls the holographic projection-based virtual role to play audio matching the interaction request.

The controlling the holographic projection-based virtual role to play audio may include, but is not limited to, controlling the mouth of the holographic projection-based virtual role to change and simultaneously playing the audio by using a sound playing apparatus.

For example, after the holographic projection-based virtual role is projected, the holographic projection-based virtual role may be controlled to dance and perform an action, or the mouth of the holographic projection-based virtual role may be controlled to change, and audio is simultaneously played, to simulate that the holographic projection-based virtual role is making a sound.

According to this embodiment, the holographic projection-based virtual role is controlled to play the animation or play the audio, thereby improving the flexibility of the holographic projection-based virtual role.

In an exemplary implementation, the interactive control method further includes adjusting, by the holographic projection device, a mood parameter of the holographic projection-based virtual role; and controlling, by the holographic projection device, a role response mode of the holographic projection-based virtual role in a case that it is determined that the mood parameter reaches a target value, and/or, enabling, by the holographic projection device, a hidden skill of the holographic projection-based virtual role in a virtual scene.

The mood parameter may be indicated by using a number or in a form such as a quantity of red hearts or an energy value. The hidden skill may include, but is not limited to, a new animation, a new sound or a new phase. For example, the hidden skill is a new animation. After the mood parameter reaches a particular value, the role may be allowed to play the new animation. In a case that the mood parameter does not reach a particular value, the role is not allowed to play the new animation.

For example, the quantity of red hearts is used for indicating the mood parameter. After interaction with the holographic projection-based virtual role, the quantity of red hearts reaches a particular value. In this case, the holographic projection-based virtual role may make a new change. For example, the holographic projection-based virtual role may dance, sing, change clothes or the like.

According to this embodiment, it is determined according to the value of the mood parameter, whether to enable the hidden skill of the holographic projection-based virtual role, thereby improving the flexibility of controlling the holographic projection device.

For ease of description, the foregoing method embodiments are stated as a series of action combinations. However, a person skilled in the art needs to learn that this application is not limited to, the described sequence of the actions because according to this application, some steps may use another sequence or may be simultaneously performed. In addition, it is to be understood by a person skilled in the art that the embodiments described in this specification are all exemplary embodiments, and the present disclosure is not limited to the actions and modules in the described embodiments.

Figure 11:
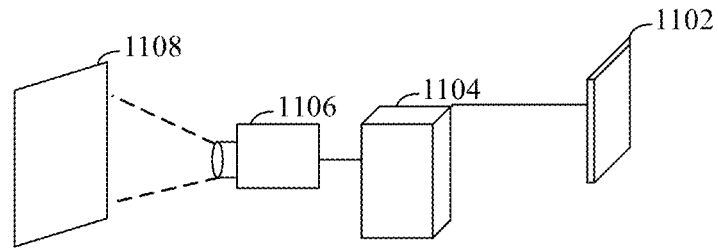
FIG. 11 is a schematic structural diagram of an exemplary holographic projection device according to an embodiment of this application.

According to another aspect of the embodiments of this application, a holographic projection device used for implementing the foregoing interactive control method is further provided. In an optional implementation, as shown in FIG. 11, the holographic projection device includes a touch panel 1102, a processor 1104, a projection light engine 1106, and a holographic projection film 1108.

The touch panel 1102 is configured to acquire touch information generated by a touch operation. The processor 1104, connected to the touch panel and the projection light engine, is configured to recognize the touch operation according to the touch information, further configured to generate an interaction request according to the recognized touch operation, the interaction request being used for requesting interaction with the holographic projection-based virtual role, and further configured to transmit the interaction request to the projection light engine. The projection light engine 1106 is configured to control the holographic projection-based virtual role to be projected onto the holographic projection film. The holographic projection film 1108 is configured to display the holographic projection-based virtual role. The projection light engine 1104 is further configured to control the holographic projection-based virtual role according to the interaction request to perform an interactive action matching the interaction request.

There may be one or a plurality of touch panels, but this application is not limited thereto. In a case that there is a plurality of touch panels, the touch panels may respectively correspond to different positions of the holographic projection-based virtual role, but this application is not limited thereto.

The processor may include, but is not limited to, a receiving module, configured to receive the touch information acquired by the touch panel 1102; a calculation module, configured to obtain the interactive action corresponding to the touch information by performing calculation according to the received touch information; a storage module, configured to store the interactive action that may be performed by the holographic projection-based virtual role; and a transmitter, configured to transmit animation information corresponding to the interactive action performed by the holographic projection virtual role according to the touch information to the projection light engine. After the projection light engine obtains the animation information, the animation information is projected into the holographic projection film, to display the animation information of the holographic projection-based virtual role.

The holographic projection device may be applied to, but is not limited to, a process of interacting with the holographic projection-based virtual role in the holographic projection device. For example, the holographic projection device may be applied to a process of interacting with a projected holographic virtual cartoon character, or be applied to a process of interacting with a projected holographic virtual building.

Figure 12:
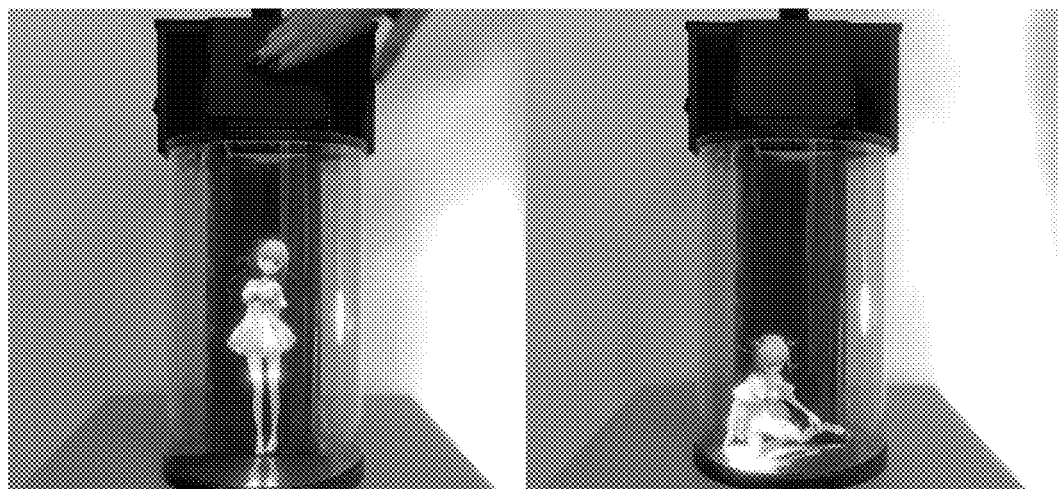
FIG. 12 is a schematic diagram of an exemplary holographic projection device according to an embodiment of this application.

An example in which the holographic projection device is applied to the process of interacting with a projected holographic virtual cartoon character is used below for description of the holographic projection device. As shown in FIG. 12, FIG. 12 shows two pictures of an exemplary holographic projection device. In FIG. 12, a region of a touch panel of a holographic projection device on the left may be touched by using a hand, so that touch information is generated. After the holographic projection device obtains the touch information, the touch information is determined. For example, swift light-touch information is obtained, and an action of a cartoon character corresponding to the touch information is then searched at a storage position, or the obtained swift light-touch information is determined, so that the action of the cartoon character corresponding to the swift light-touch information is determined, thereby projecting the action corresponding to the swift light-touch information into the touch panel. A cartoon character in a holographic projection device on the right in FIG. 12 is used as an example. In a case that the holographic projection device receives the swift light-touch information, an animation of the cartoon character being knocked down is projected, thereby forming interaction between a user and the cartoon character.

For other implementations of this application, reference may be made to the implementation described in the foregoing interactive control method, and details are not described herein. The technical details of the holographic projection device are shown in the method embodiments.

Figure 13:
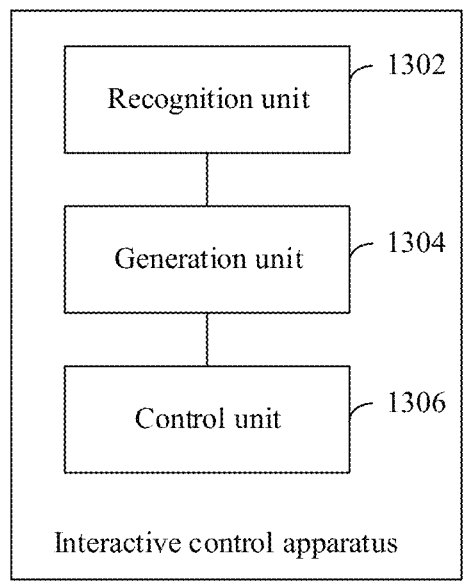
FIG. 13 is a schematic structural diagram of an exemplary interactive control apparatus according to an embodiment of this application.

According to another aspect of the embodiments of this application, an interactive control apparatus used for implementing the foregoing interactive control method is further provided. As shown in FIG. 13, the apparatus is applied to a holographic projection device, including a recognition unit 1302, a generation unit 1304, and a control unit 1306. One or more of the units (and the modules and submodules mentioned below) can be implemented by processing circuitry, software, or a combination thereof The recognition unit 1302 is configured to recognize a touch operation performed on a touch panel. The holographic projection device is configured to display a holographic projection-based virtual role. Further, the touch panel is disposed on the holographic projection device.

The generation unit 1304 is configured to generate an interaction request according to the recognized touch operation. The interaction request is used for requesting interaction with the holographic projection-based virtual role.

The control unit 1306 is configured to control the holographic projection-based virtual role to perform an interactive action matching the interaction request.

In an exemplary implementation, to improve the flexibility of controlling the holographic projection device, the recognition unit may include a first obtaining module and a recognition module. The first obtaining module is configured to obtain touch information generated by the interaction between a touch point corresponding to the touch operation and the touch panel. The recognition module is configured to recognize the touch operation according to the touch information.

In an exemplary implementation, to improve the flexibility of controlling the holographic projection device, the recognition module may include a first determination submodule and a second determination submodule.

The first determination submodule is configured to determine, in a case that it is determined according to the touch information that a quantity of swipes performed on the touch panel by the touch point is greater than a first threshold, that the touch operation is a caress performed on the holographic projection-based virtual role, the swipe being an action in which a movement distance of the touch point on the touch panel is greater than a second threshold.

The second determination submodule is configured to determine, in a case that it is determined according to the touch information that the movement distance of the touch point on the touch panel is less than a third threshold and action duration of the touch point on the touch panel is less than a fourth threshold, that the touch operation is a pat performed on the holographic projection-based virtual role.

In an exemplary implementation, to improve the flexibility of controlling the holographic projection device, the first determination submodule may further be configured to perform the following steps:

obtaining a first position at which the touch point stays on the touch panel at a first moment and a second position at which the touch point stays on the touch panel at a second moment, a time interval between the first moment and the second moment being a frame period;
recognizing, in a case that it is determined that a distance between the first position and the second position is greater than the second threshold, an action in which the touch point moves from the first position to the second position as the swipe, and adding one to the quantity of swipes; and
determining that the touch operation is a caress performed on the holographic projection-based virtual role in a case that it is determined that the quantity of swipes is greater than the first threshold.

In an exemplary implementation, to improve the flexibility of controlling the holographic projection device, the second determination submodule may further be configured to perform the following steps:

obtaining a third position at which the touch point stays on the touch panel at a third moment and a fourth position at which the touch point stays on the touch panel at a fourth moment; and
determining, in a case that it is determined that a distance between the third position and the fourth position is less than the third threshold and a time interval between the third moment and the fourth moment is less than the fourth threshold, that the touch operation is the pat performed on the holographic projection-based virtual role.

In an optional implementation, to improve the flexibility of controlling the holographic projection device, the second determination submodule may further be configured to perform the following steps:

performing the following steps in each frame period after the third position at which the touch point stays on the touch panel is obtained, until it is detected that the touch operation is ended:
obtaining a current position at which the touch point stays on the touch panel at a target moment in a current frame period, a time interval between the third moment and the target moment being N frame periods, N≥1, N being an integer;
obtaining, in a case that it is detected that the touch operation is not ended, a target position at which the touch point stays on the touch panel at the target moment in a next frame period of the current frame period, using the target moment in the next frame period as the target moment in the current frame period, and using the target position at which the touch point stays in the next frame period as the current position;
using, in a case that it is detected that the touch operation is ended, the target moment in the current frame period as the fourth moment, and using the current position as the fourth position; and
determining, in a case that an action region of the touch point on the touch panel is less than a fifth threshold, that the touch operation is ended.

In an exemplary implementation, to improve the flexibility of controlling the holographic projection device, the recognition unit further includes a second obtaining module and a determination module. The second obtaining module is configured to obtain the action region of the interaction between the touch point and the touch panel after recognizing the touch operation according to the touch information. The determination module is configured to determine, according to a position of the action region on the touch panel, interactive information requested by the interaction request.

In an exemplary implementation, to improve the flexibility of controlling the holographic projection device, the determination module includes at least one of a third determination submodule and a fourth determination submodule. The third determination submodule is configured to determine, according to the position of the action region on the touch panel, a role part of the interaction with the holographic projection-based virtual role; and determine, according to the role part, the interactive information requested by the interaction request. The fourth determination submodule is configured to determine, according to the position of the action region on the touch panel, an interaction type of the interaction with the holographic projection-based virtual role; and determine, according to the interaction type, the interactive information requested by the interaction request.

In an exemplary implementation, to improve the flexibility of controlling the holographic projection device, the control unit includes at least one of a first control module and a second control module. The first control module is configured to control the holographic projection-based virtual role to play an animation matching the interaction request. The second control module is configured to control the holographic projection-based virtual role to play audio matching the interaction request.

In an exemplary implementation, to improve the flexibility of controlling the holographic projection device, the foregoing apparatus further includes an adjustment unit. The adjustment unit is configured to adjust a mood parameter of the holographic projection-based virtual role, so that the holographic projection device controls a role response mode of the holographic projection-based virtual role in a case that it is determined that the mood parameter reaches a target value, and/or, the holographic projection device enables a hidden skill of the holographic projection-based virtual role in a virtual scene.

Exemplary technical details of the interactive control apparatus are shown in the method embodiments.

According to still another aspect of the embodiments of this application, a storage medium, such as a non-transitory computer-readable storage medium, is further provided. The storage medium stores a computer program, the computer program being configured to perform, when being run, steps in any one of the foregoing method embodiments.

The storage medium may be configured to store a computer program used for performing the following steps.

In a first step, a touch operation performed on a touch panel is recognized, the holographic projection device being configured to display a holographic projection-based virtual role, the touch panel being disposed on the holographic projection device.

In a second step, an interaction request is generated according to the recognized touch operation. The interaction request is used for requesting interaction with the holographic projection-based virtual role.

In a third step, the holographic projection-based virtual role is controlled to perform an interactive action matching the interaction request.

In some embodiments, a person of ordinary skill in the art may understand that all or some of the steps of the methods in the foregoing embodiments may be implemented by a program by instructing hardware relevant to a terminal device. The program may be stored in a computer-readable storage medium, and the storage medium may include: a flash drive, a read-only memory (ROM), a random access memory (RAM), a magnetic disk, an optical disc, and the like.

In addition, an embodiment of this application further provides an electronic device, including a memory and a processor, the memory storing a computer program, the processor being configured to perform the foregoing interactive control method by using the computer program.

Embodiments of this application further include a computer program product, including instructions, when being run on a server, causing the server to perform the foregoing interactive control method provided in the foregoing embodiments.

The sequence numbers of the embodiments of this application are merely for description purpose but do not indicate the preference of the embodiments.

When the integrated unit in the foregoing embodiments is implemented in a form of a software functional unit and sold or used as an independent product, the integrated unit may be stored in the foregoing computer-readable storage medium. Based on such understanding, all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

The embodiments in the specification are all described in a progressive manner. For same or similar parts in the embodiments, reference may be made to these embodiments, and each embodiment focuses on a difference from other embodiments. The apparatus disclosed in the embodiments are corresponding to the method disclosed in the embodiments and therefore is only briefly described, and reference may be made to the descriptions of the method for the associated part.

A person skilled in the art may further realize that the units and algorithm steps of the examples described with reference to the embodiments disclosed in this specification can be implemented by electronic hardware, computer software, or a combination thereof. To clearly describe the interchangeability of the hardware and software, the parts and steps of each example are described generally according to the functions in the foregoing description. Whether these functions are executed in the manner of hardware or software depends on specific applications and design constraints of the technical solutions. A person skilled in the art may use different methods to implement the described functions for each particular application, but it is not to be considered that the implementation goes beyond the scope of this application.

In combination with the embodiments herein, steps of the method or algorithm described may be directly implemented using hardware, a software module executed by a processor, or the combination thereof. The software module may be placed in a RAM, a memory, a ROM, an electrically programmable ROM (EPROM), an electrically erasable programmable ROM (EEPROM), a register, a hard disk, a removable magnetic disk, a CD-ROM, or any storage medium of other forms well-known in the technical field.

The foregoing description of the disclosed embodiments enables a person skilled in the art to implement or use various aspects of the present disclosure. Various modifications to the embodiments can be made by person skilled in the art, and general principles defined in this specification may be implemented in other embodiments without departing from the spirit or scope of the present disclosure. Therefore, the display application is not limited to, the described embodiments.

What is claimed is:

1. An interactive control method, comprising:
obtaining touch information that is generated based on an interaction between a touch point corresponding to a touch operation and a touch panel;

recognizing, by circuitry of a holographic projection device, the touch operation performed on the touch panel according to the touch information, the holographic projection device being configured to display a holographic projection-based virtual character, the touch panel being disposed on the holographic projection device;

generating, by the circuitry, an interaction request according to the recognized touch operation, the interaction request corresponding to an interaction with the holographic projection-based virtual character; and controlling, by the circuitry, the holographic projection-based virtual character to perform an interactive action associated with the interaction request.

2. The method according to claim 1, wherein the recognizing comprises:

determining, in a case that a quantity of swipes performed on the touch panel by the touch point is determined to be greater than a first threshold, that the touch operation is a caress performed on the holographic projection-based virtual character, each of the swipes being an action in which a movement distance of the touch point on the touch panel is greater than a second threshold; and determining, in a case that the movement distance of the touch point on the touch panel is determined to be less than a third threshold and an action duration of the touch point on the touch panel is less than a fourth threshold, that the touch operation is a pat performed on the holographic projection-based virtual character.

3. The method according to claim 2, wherein the determining that the touch operation is the caress comprises:

obtaining a first position at which the touch point is on the touch panel at a first moment and a second position at which the touch point is on the touch panel at a second moment, a time interval between the first moment and the second moment being a frame period;

recognizing, in a case that a distance between the first position and the second position is determined to be greater than the second threshold, an action in which the touch point moves from the first position to the second position as one of the swipes, and adding one to the quantity of swipes; and determining, in a case that the quantity of swipes is determined to be greater than the first threshold, that the touch operation is the caress performed on the holographic projection-based virtual character.

4. The method according to claim 2, wherein the determining that the touch operation is the pat comprises:

obtaining a third position at which the touch point is on the touch panel at a third moment and a fourth position at which the touch point is on the touch panel at a fourth moment; and determining, in a case that a distance between the third position and the fourth position is determined to be less than the third threshold and a time interval between the third moment and the fourth moment is less than the fourth threshold, that the touch operation is the pat performed on the holographic projection-based virtual character.

5. The method according to claim 4, wherein the obtaining the fourth position comprises:

performing, for each frame period after the third position at which the touch point is on the touch panel until the touch operation is ended:

obtaining a current position at which the touch point is on the touch panel at a target moment in a current frame period, a time interval between the third moment and the target moment being N frame periods, N≥1, N being an integer;

obtaining, in a case that the touch operation is not ended, a target position at which the touch point is on the touch panel at the target moment in a next frame period of the current frame period, using the target moment in the next frame period as the target moment in the current frame period, and using the target position at which the touch point is in the next frame period as the current position;

using, in a case that the touch operation is ended, the target moment in the current frame period as the fourth moment, and using the current position as the fourth position; and determining, in a case that an action region of the touch point on the touch panel is less than a fifth threshold, that the touch operation is ended.

6. The method according to claim 1, wherein after the recognizing the touch operation according to the touch information, the method further comprises:

obtaining an action region of the interaction between the touch point and the touch panel; and determining, according to a position of the action region on the touch panel, interactive information requested by the interaction request.

7. The method according to claim 6, wherein the determining the interactive information requested by the interaction request comprises at least one of:

determining, according to the position of the action region on the touch panel, a role part of the interaction with the holographic projection-based virtual character, and determining, according to the role part, the interactive information requested by the interaction request; or determining, according to the position of the action region on the touch panel, an interaction type of the interaction with the holographic projection-based virtual character, and determining, according to the interaction type, the interactive information requested by the interaction request.

8. The method according to claim 1, wherein the controlling comprises:

controlling the holographic projection-based virtual character to play at least one of (i) an animation that is associated with the interaction request or (ii) audio that matches the interaction request.

9. The method according to claim 1, further comprising:

adjusting a mood parameter of the holographic projection-based virtual character; and in a case that the mood parameter is determined to reach a target value, perform at least one of controlling a role response mode of the holographic projection-based virtual character, or enabling a hidden skill of the holographic projection-based virtual character in a virtual scene.

10. A non-transitory computer-readable storage medium storing instructions which when executed by a computer cause the computer to perform the interactive control method according to claim 1.

11. The method according to claim 1, wherein the generating the interaction request comprises:

determining a type of the interaction with the holographic projection-based character according to the recognized touch operation.

12. A holographic projection device, comprising:

a holographic projection film configured to display a holographic projection-based virtual character;

processing circuitry configured to control the holographic projection-based virtual character to be projected onto the holographic projection film; and a touch panel configured to acquire touch information generated based on an interaction between a touch point corresponding to a touch operation and a touch panel, wherein the processing circuitry is configured to:
recognize the touch operation according to the touch information,
generate an interaction request according to the recognized touch operation, the interaction request being used for requesting interaction with the holographic projection-based virtual character, and
control the holographic projection-based virtual character according to the interaction request to perform an interactive action matching the interaction request.

13. The device according to claim 12, wherein the processing circuitry is configured to
determine an action region of the touch operation on the touch panel according to the touch information; and
determine, according to a position of the action region, interactive information requested by the interaction request.

14. The device according to claim 13, wherein the processing circuitry is configured to
adjust an action of the projected holographic projection-based virtual character according to the interactive information.

15. An interactive control apparatus, comprising:
circuitry configured to
obtain touch information that is generated based on an interaction between a touch point corresponding to a touch operation and a touch panel;
recognize the touch operation performed on the touch panel of a holographic projection device according to the touch information, the holographic projection device being configured to display a holographic projection-based virtual character, the touch panel being disposed on the holographic projection device;
generate an interaction request according to the recognized touch operation, the interaction request corresponding to an interaction with the holographic projection-based virtual character; and
control the holographic projection-based virtual character to perform an interactive action associated with the interaction request.

16. The interactive control apparatus according to claim 15, wherein the circuitry is configured to
determine, in a case that a quantity of swipes performed on the touch panel by the touch point is determined to be greater than a first threshold, that the touch operation is a caress performed on the holographic projection-based virtual character, each of the swipes being an action in which a movement distance of the touch point on the touch panel is greater than a second threshold; and
determine, in a case that the movement distance of the touch point on the touch panel is determined to be less than a third threshold and an action duration of the touch point on the touch panel is less than a fourth threshold, that the touch operation is a pat performed on the holographic projection-based virtual character.

17. The interactive control apparatus according to claim 16, wherein the circuitry is configured to
obtain a first position at which the touch point is on the touch panel at a first moment and a second position at which the touch point is on the touch panel at a second moment, a time interval between the first moment and the second moment being a frame period;
recognize, in a case that a distance between the first position and the second position is determined to be greater than the second threshold, an action in which the touch point moves from the first position to the second position as one of the swipes, and add one to the quantity of swipes; and
determine, in a case that the quantity of swipes is determined to be greater than the first threshold, that the touch operation is the caress performed on the holographic projection-based virtual character.

18. The interactive control apparatus according to claim 16, wherein the circuitry is configured to
obtain a third position at which the touch point is on the touch panel at a third moment and a fourth position at which the touch point is on the touch panel at a fourth moment; and
determine, in a case that a distance between the third position and the fourth position is determined to be less than the third threshold and a time interval between the third moment and the fourth moment is less than the fourth threshold, that the touch operation is the pat performed on the holographic projection-based virtual character.

19. The interactive control apparatus according to claim 18, wherein the circuitry is configured to
perform, for each frame period after the third position at which the touch point is on the touch panel until the touch operation is ended:
obtain a current position at which the touch point is on the touch panel at a target moment in a current frame period, a time interval between the third moment and the target moment being N frame periods, N≥1, N being an integer;
obtain, in a case that the touch operation is not ended, a target position at which the touch point is on the touch panel at the target moment in a next frame period of the current frame period, using the target moment in the next frame period as the target moment in the current frame period, and use the target position at which the touch point is in the next frame period as the current position;
use, in a case that the touch operation is ended, the target moment in the current frame period as the fourth moment, and using the current position as the fourth position; and
determine, in a case that an action region of the touch point on the touch panel is less than a fifth threshold, that the touch operation is ended.

20. The interactive control apparatus according to claim 15, wherein the circuitry is configured to
determine a type of the interaction with the holographic projection-based character according to the recognized touch operation.

* * * * *